United States Patent [19]

Takada et al.

[11] Patent Number: 4,867,262

[45] Date of Patent: Sep. 19, 1989

[54] FOUR WHEEL DRIVE SYSTEM FOR VEHICLE

[75] Inventors: Mitsuru Takada; Hiroshi Itoh, both of Toyota; Tokuyuki Takahashi, Aichi, all of Japan

[73] Assignee: Toyota Jidosha Kabushiki Kaisha, Aichi, Japan

[21] Appl. No.: 123,527

[22] Filed: Nov. 20, 1987

[30] Foreign Application Priority Data

Nov. 28, 1986 [JP] Japan .................................. 61-283891

[51] Int. Cl.4 ............................................. B60K 17/34
[52] U.S. Cl. .................................................. 180/249
[58] Field of Search ............... 180/197, 247, 248, 249, 180/250

[56] References Cited

U.S. PATENT DOCUMENTS

| | | | |
|---|---|---|---|
| 4,511,014 | 4/1985 | Makita | 180/197 X |
| 4,669,569 | 6/1987 | Suzuki | 180/249 |
| 4,690,239 | 9/1987 | Takahashi | 180/249 |

FOREIGN PATENT DOCUMENTS

| | | | |
|---|---|---|---|
| 2434969 | 3/1980 | France | 180/249 |
| 62-74716 | 4/1987 | Japan | 180/249 |
| 2140104 | 11/1984 | United Kingdom | 180/249 |
| 2172863 | 10/1986 | United Kingdom | 180/249 |

*Primary Examiner*—Mitchell J. Hill
*Attorney, Agent, or Firm*—Oliff & Berridge

[57] ABSTRACT

In a four wheel drive vehicle, wherein either a state where differential action between front wheels and rear wheels is restricted or a permitted state can be selected, the differential rate is calculated during stable running conditions, and, when the differential rate is greater than or equal to a predetermined value, the restriction of differential action is prohibited. As a result, power circulation can be prevented when there is a difference in effective radius between the front wheels and rear wheels due to, e.g., use of a temper tire, mounting of chains on the tires, or the like.

7 Claims, 5 Drawing Sheets

FOUR WHEEL DRIVE SYSTEM FOR VEHICLE

BACKGROUND OF THE INVENTION

This invention relates to a four wheel drive system for a vehicle, wherein power circulation is prevented, thereby eliminating excessive loads, worn tires and deteriorated fuel consumption and the like due to power circulation.

Recently, as the drive systems used in vehicles such as motor vehicles, four wheel drive systems have become popular. Heretofore, there have been two types of such four wheel drive systems. The first is one having a two wheel - four wheel switching control clutch, wherein front wheels and rear wheels are selectively driven and connected to each other. The second is one having a center differential gear and a differential control clutch for restricting (up to the degree of prohibiting) the differential action of the center differential gear, whereby the front wheels and the rear wheels can be directly or almost directly connected to each other. These are disclosed in bulletins of Japanese Patent Kokai (Laid-Open) Nos. 72420/1980, 53520/1983 and 101829/1983.

When the above-described release and restriction of differential action between front wheels and rear wheels are controlled in response to an outside signal, an arrangement may be adopted in which the differential action is restricted throughout the running time of the vehicle or during most of the running time, and the restriction of differential action is suitably released (or the degree of the restriction changed) in accordance with the running conditions of the vehicle. Or, an arrangement may be adopted in which the differential action between the front wheels and the rear wheels is permitted during normal operation, and the restriction of differential action is applied when necessary.

In general, when the difference in rotary speed between front wheels and rear wheels is increased, it is recognized that either the front wheels or the rear wheels are slipping relative to the road surface, whereupon the differential action is restricted.

However, conventional four wheel drive systems have not taken into account differences in effective radii of tires caused by changed in weight and load acting on front wheels or rear wheels, change in pneumatic pressures within the tires, changing wear in the tires, use of a temper tire, attachment of chains to the tires, and the like. Accordingly, if the restriction of differential action is performed in the case when the such differences exist in the effective radii of the tires, power circulation occurs, whereby excessive load, abrasion of tires, deterioration in fuel consumption and the like may be induced.

SUMMARY OF THE INVENTION

The present invention has been developed to obviate the above-described disadvantages of the prior art and has as its object the provision of a four wheel drive system for a vehicle, such that when there is a difference in effective radii of the tires, and the restriction of differential action would cause excessive load and abrasion of tires due to the power circulation, the above-described disadvantages are prevented from occurring.

To achieve the above-described object, as shown in FIG. 1 (A), a first aspect of the present invention contemplates a four wheel drive system for a vehicle, wherein the restriction of the differential action between front wheels and rear wheels is released or the degree of restriction is changed as necessary. The system includes:

means for detecting whether or not the running conditions of the vehicle are stable;

means for temporarily releasing the restriction of differential action between front wheels and rear wheels when the running conditions of the vehicle are detected to be stable;

means for detecting a differential rate between front wheels and rear wheels upon release of the restriction of differential action; and means for prohibiting (inclusive of concept of restricting) the restriction of differential action when the differential rate is detected to be eaual to a predetermined value or thereabove.

Furthermore, to achieve the above-described object, as shown in FIG. 1 (B), a second aspect of the present invention is directed to a four wheel drive system for a vehicle, wherein the differential action between front wheels and rear wheels is restricted as necessary. The system includes:

means for detecting whether or not the running conditions of the vehicle are stable;

means for detecting whether or not differential action between front wheels and rear wheels is being restricted;

means for detecting a differential rate between front wheels and rear wheels when it is detected that the running conditions of the vehicle are stable and the differential action between front wheels and the rear wheels is not being restricted; and means for prohibiting (inclusive of cencept of restricting) the restriction of differential action when the differential rate is greater than or equal to a predetermined value.

The first aspect of the present invention relates to a four wheel drive system for a vehicle, constructed such that the differential action between front wheels and rear wheels is restricted throughout the running time of the vehicle or during most of the running time, and the restriction is released or the degree of the restriction is changed as necessary.

There are four types of four wheel drive systems wherein the differential action between front wheels and rear wheels is released or restricted. These include: (1) those wherein the drive can be switched between two wheel and four wheel by an ON-OFF control clutch, (2) those wherein the drive can be switched between two wheel and four wheel by a control clutch having a variable transmitting capacity such as a wet-type multi-disk clutch, (3) those wherein a center differential gear, positioned between the front wheels and rear wheels, is prohibited or released by an ON-OFF control clutch, and (4) those wherein a center differential gear, positioned between the front wheels and rear wheels, is controlled by a control clutch having a variable transmitting capcity such as a wet-type multi-disk clutch: and, in this invention, any type of the above may be adopted.

In order to detect the differential rate between front wheels and rear wheels, differential action is permitted. According to a first aspect of the present invention, since the differential action between front wheels and rear wheels is restricted throughout the running time of the vehicle or during most of the running time, in order to detect the differential rate, the restriction of differential action is temporarily released. One of the features of the first aspect of the present invention resides in this active release of the restriction of differential action for the purpose of detecting the differential rate. The temporary release of the restriction of differential action is performed only when the running conditions of the vehicle are determined to be stable. As a result, the differential rate between front wheels and rear wheels can be detected under conditions where the change in behavior of the vehicle caused by release of restriction of differential action is extremely small, and a small differential rate caused by a difference in the effective radii of the tires can be easily and accurately detected.

When the differential rate is detected to be greater than or equal to the predetermined value by this detection, the restriction of differential action thenceforth is prohibited (or restricted), whereby front wheels and rear wheels can rotate in accordance with the difference in effective radii of the tires, so that the excessive loads, unusual wears, deterioration in fuel consumption and the like due to power circulation can be prevented.

The second aspect of the present invention relates to a four wheel drive system for a vehicle, constructed such that the differential action between front wheels and rear wheels is permitted during normal operation, and the differential action therebetween is restricted as necessary. The second aspect of the present invention is similar to the first aspect in that the specific type or types of four wheel drive systems are not limited.

In the second aspect of the present invention, the differential rate between front wheels and rear wheels detected when the running conditions are detected to be stable and the restriction of differential action is not performed. By so doing, a small differential rate caused by a difference in effective radius of the tires can be easily and accurately detected, and a change in the behavior of the vehicle due to detection of the differential rate can be completely prevented. More specifically, in the four wheel drive system according to the second aspect of the present invention, differential action between front wheels and rear wheels is permitted during most of the running time of the vehicle, whereby this time may be utilized to detected the differential rate.

When the differential rate is detected to be greater than or equal to a predetermined value, the restriction of differential action thenceforth is prohibited (or restricted), so that excessive loads, unusual wears of the tires, deterioration in fuel consumption and the like due to power circulation can be prevented similarly to the first aspect of the present invention.

According to the first and second aspects of the present invention, a preferably embodiment is an arrangement by which an apparatus for detecting whether or not the running conditions of the vehicle are stable detects whether or not such conditions are established, i.e., whether the vehicle speed is greater than or equal to a predetermined value, the steering angle is less than or equal to a predetermined value and the engine load is less than or equal to a predetermined value. As a result, the differential rate can be detected while the vehicle is in a stable operating condition.

Furthermore, according to the first aspect of the present invention, a preferable embodiment is an arrangement such that, when the differential rate is detected to be smaller than a predetermined value, the release of the restriction of differential action for the detection of the differential rate is stopped until the vehicle stops. With this arrangement, frequent detection of the differential rate is discontinued, so that the original control of the restriction of differential action in accordance with the various running conditions is fully performed.

Furthermore, according to the first aspect of the present invention, a preferable embodiment is an arrangement such that, when the differential rate is detected to be greater than or equal to a predetermined value, restriction of differential action is prohibited, and detection of the differential rate is repeated each time the running conditions of the vehicle are detected to be stable, until the vehicle stopped. With this arrangement, prohibition of restriction of differential action due to a mistaken detection can be prevented. More specifically, even after restriction of the differential is prohibited, if the differential rate is detected to be smaller than the predetermined value a few times, for example, the prohibition of restriction of differential action may be released.

When starting from a stop, before the conditions for detecting the differential rate are established, the values at the time of the previous detection may be stored and used. With this arrangement, when the value of the differential rate of the previous time is smaller than a predetermined value, the original restriction is maintained until the value is detected again. When the value of the differential rate of the previous time is greater than or equal to a predetermined value, differential restriction can be prohibited until the value is detected again.

BRIEF DESCRIPTION OF THE DRAWINGS

The above object, features and advantages of the present invention, as well as other objects and advantages thereof, will become more apparent from the description of the invention which follows, taken in conjunction with the accompanying drawings, wherein like reference characters designate the same to similar parts and wherein.

DESCRIPTION OF THE PREFERRED EMBODIMENT

The present invention will be described in detail with reference to the accompanying drawings which illustrate preferred embodiments of the present invention.

Figure 1A:
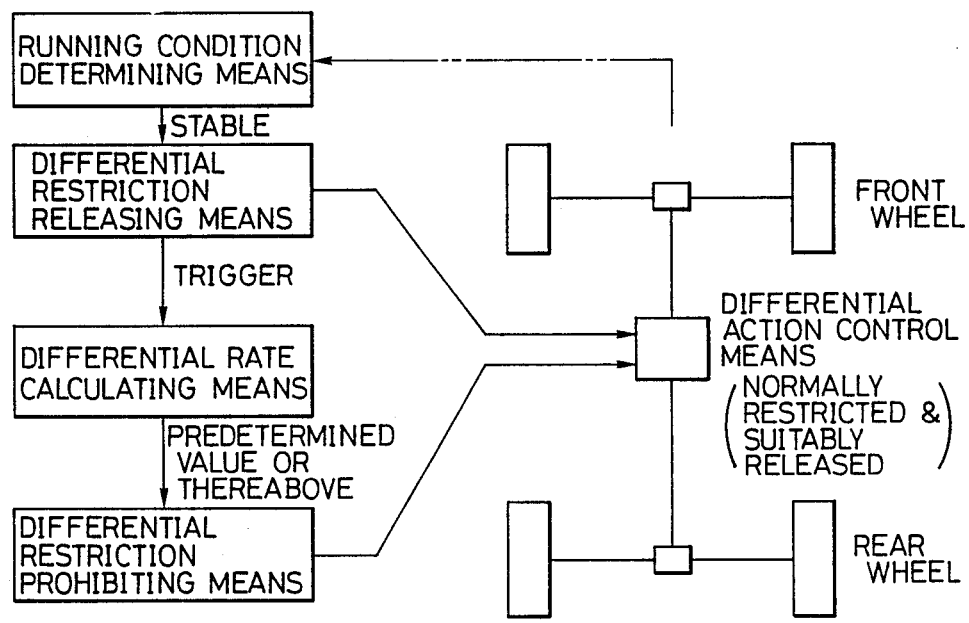
FIGS. 1 (A) and 1 (B) are block diagrams showing technical illustration of the first and second aspects of the present invention, respectively.
Figure 1B:
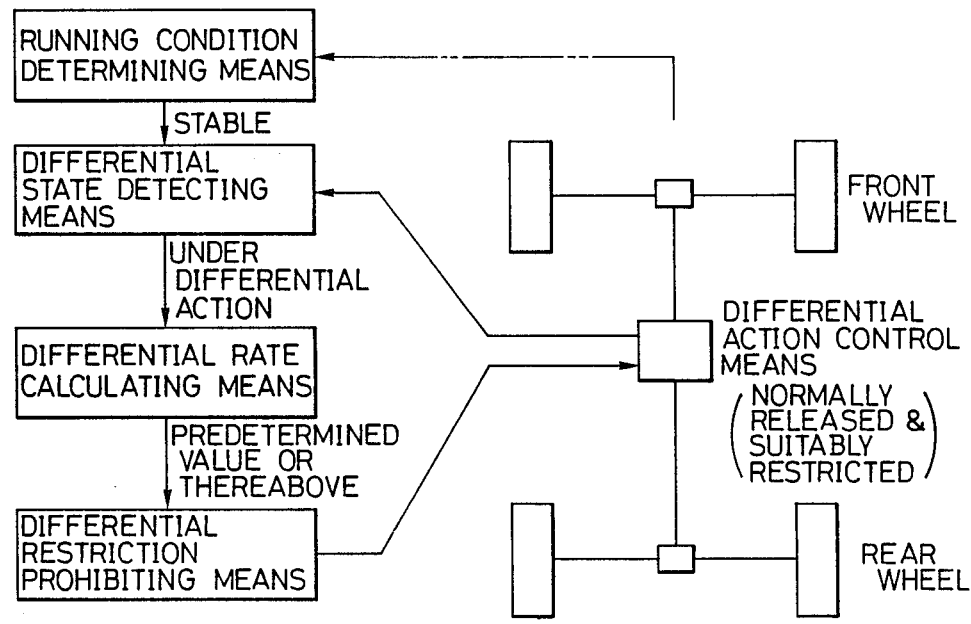
Figure 2:
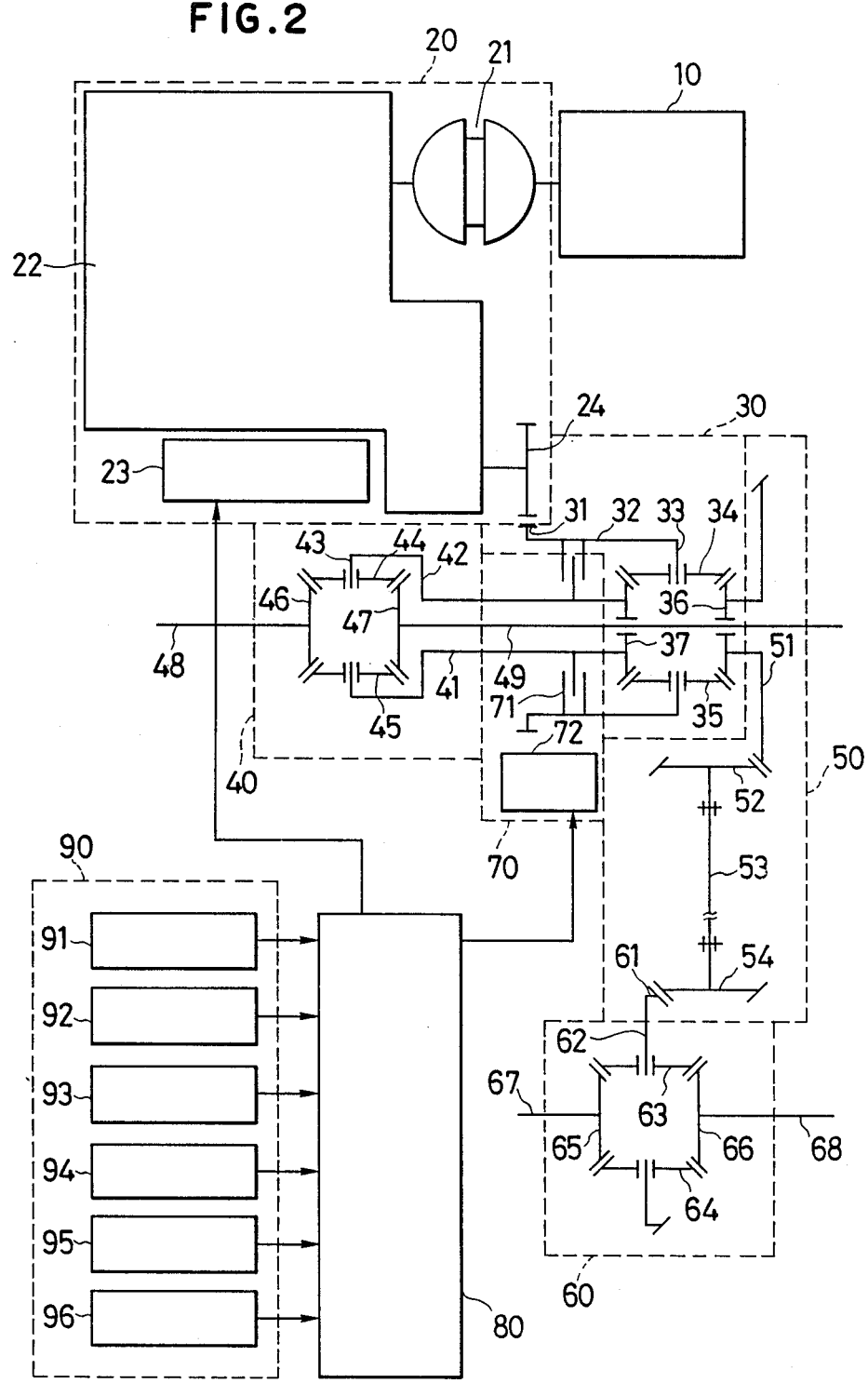
FIG. 2 is a conceptual diagram showing the power transmission system of the four wheel drive system for the vehicle, to which the present invention is applied.

Referring to FIG. 2, the four wheel drive systems includes an engine 10, an automatic transmission 20, a center differential gear unit 30, a front differential gear unit 40, a transfer unit 50, a rear differential gear unit 60, a differential control clutch unit 70, a control unit 80, and various input systems 90.

The engine 10 is laterally placed in the front portion of the vehicle. Output from the engine is transmitted to the automatic transmission 20.

The automatic transmission 20 includes a fluid type torque converter 21 and an auxiliary transmission 22. A hydraulic control device 23 shifts the automatic transmission 20 among four forward gears and one backward gear. The hydraulic control device 23 is controlled in response to a original from the control unit 80. The power through the automatic transmission 20 is transmitted through an output gear 24 to an input gear 31 which is part of the center differential gear unit 30.

The center differential gear unit 30 includes a differential case 32 for integrally supporting the input gear 31, two differential pinions 34 and 35 positioned opposite one another and rotatably supported by a pinion shaft 33 secured to the differential case 32, a side gear 36 for transmitting power to the rear wheels, and a side gear 37 for transmitting power to the front wheels. The side gear 36 is meshed with the differential pinions 34 and 35, and is connected to a transfer ring gear 51 which is part of transfer unit 50. The side gear 37 is meshed with the differential pinions 34 and 35, and is connected through a hollow front wheel drive shaft 41 to a differential case 42 which is part of the front differential gear unit 40.

The front differential gear unit 40 includes two differential pinions 44 and 45 positioned opposite one another and rotatably supported by a pinion shaft 43 secured to the differential case 42, a side gear 46 for transmitting power to the left front wheel, and a side gear 47 for transmitting power to the right front wheel. The side gear 46 and 47 are each meshed with the differential pinions 44 and 45. A shaft 48 of the left front wheel is connected to the side gear 46 for transmitting power to the left front wheel. And a shaft 49 of the right front wheel is connected to the side gear 47 for transmitting power to the right front wheel.

The transfer unit 50 includes a transfer ring gear 51 connected to the side gear 36 for transmitting power to the rear wheels, a driven pinion 52 meshing with the transfer ring gear 51, and an output rotary gear 54 which is integrally rotatable with the driven pinion 52 through a propeller shaft 53. The output rotary gear 54 is connected to the rear differential gear unit 60.

The rear differential gear unit 60 includes a differential case 61 formed with a ring gear which is meshed with the output rotary gear 54, two differential pinions 63 and 64 which are positioned opposite one another and which are rotatably supported by a pinion shaft 62 secured to the differential case 61, a side gear 65 for transmitting power to the left rear wheel, and a side gear 66 for transmitting power to the right rear wheel. The side gear 65 is meshed with the differential pinions 63 and 64, and is connected to a shaft 67 if the left rear wheel, and the side gear 66 is meshed with the differential pinions 63 and 64, and is connected to a shaft 68 of the right rear wheel.

Figure 3:
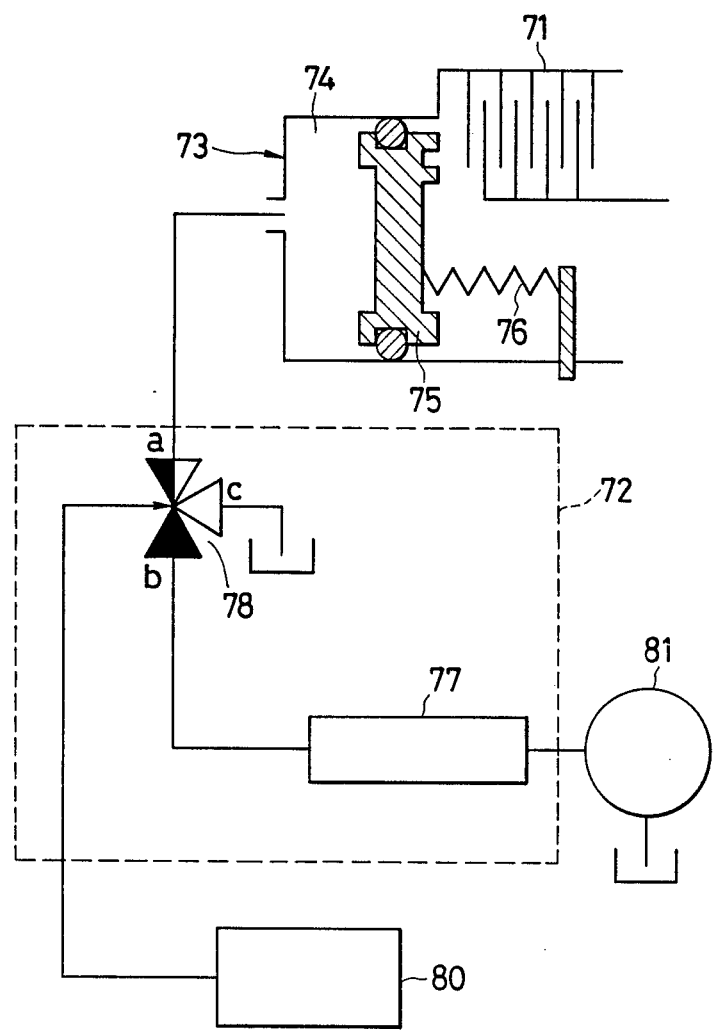
FIG. 3 is a conceptual diagram of hydraulic control circuit of the differential control clutch of the system shown in FIG. 2.

The differential control clutch unit 70 is adapted to selectively connect the differential case 32, which is an input member of the center differential gear 30, to the front wheel drive shaft 41, which is an output member of the center differential gear 30. The clutch unit 70 includes a wet-type multi-disk clutch 71 and a hydraulic control device 72 for controlling the multi-disk clutch 71. More specifically, as shown in FIG. 3, the multi-disk clutch 71 is provided with a hydraulic servo device 73. A servo piston 75 is urged to the right against the resilient force of a return spring 76 by servo oil pressure fed to an oil chamber 74 of the hydraulic servo device 73. With this arrangement, the differential case 32 and the front wheel drive shaft 41 are connected to each other, and the torque transmitting capacity is increased or decreased in proportion to the increase or decrease of the servo oil pressure fed to the oil chamber 74. The hydraulic control device 72 supplies the servo oil pressure to the oil chamber 74 of the hydraulic servo device 73. The hydraulic control device 72 includes a line oil pressure control valve 77 for regulating oil pressure of an oil pump 81 incorporated in the automatic transmission 20. The pressure of the oil supplied by the oil pump corresponds to the engine load, and is controlled by an electromagnetic servo hydraulic control valve 78. The servo hydraulic control valve 78 includes a port "a" connected to the oil chamber 74, an oil pressure port "b", to which the line oil pressure from the line oil pressure control valve 77 is supplied, and a drain port "c". The servo hydraulic control valve 78 connects the port "a" to the oil pressure port "b" while current passed through the control valve 78 and connects the port "a" to the drain port "c" while current is not passed through the control valve 78. The servo hydraulic control valve 78 is controlled in response to pulse signals from the control device 80. The pulse signals have a specific duty ratio. With this arrangement, servo oil pressure commensurate to the duty ratio is fed to the oil chamber 74.

The control unit 80 controls the hydraulic control devices 23 and 72 in response to respective input signals from the input systems 90. The control unit 80 receives throttle opening information from a throttle opening sensor 91, manual shift range (position of manual shift lever) information of the automatic transmission 20 from a manual shift position sensor 92, front wheel rotary speed information from front wheel rotary speed sensors 93 and 94, rear wheel rotary speed information from a rear wheel rotary speed sensor 95, vehicle steering angle information from a steering angle sensor 96. Other sensors may be included described. Upon receiving these input signals, the control unit 80 outputs control signals for controlling gear stages of the automatic transmission 20 to the hydraulic control device 23 in accordance with the manual range information, the front wheel rotary speed or the rear wheel rotary speed (vehicle speed), and the throttle opening. Furthermore, the control device 80 outputs pulse signals having the specific duty raito for controlling the torque transmitting capacity of the differential control clutch 70 to the hydraulic control device 72 in accordance with input torque to the automatic transmission 20 and the gear stages.

Figure 4:
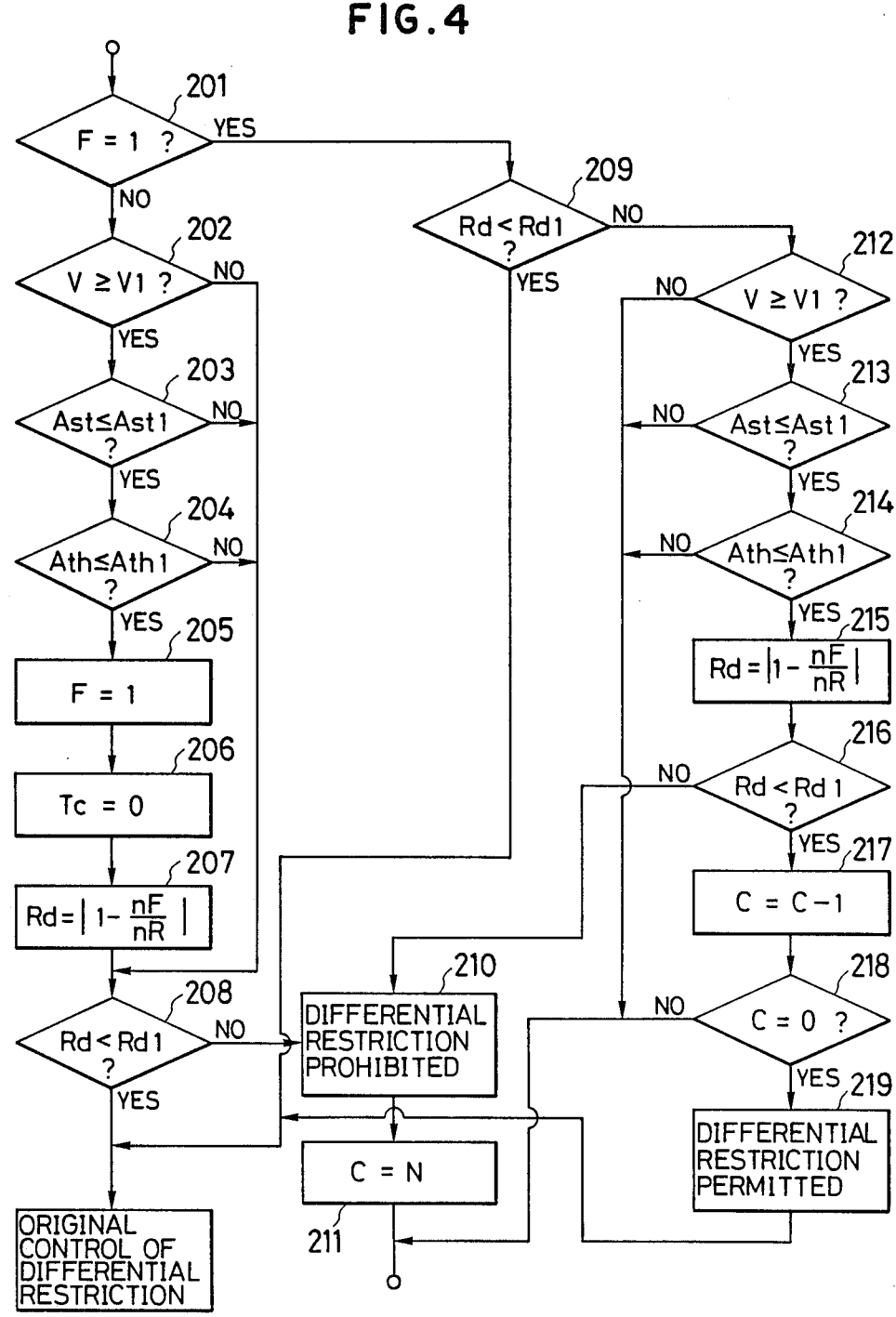
FIG. 4 is a flow chart showing the control procedure used in the four wheel drive system of FIG. 2.

FIG. 4 shows the inerative control procedure in the above system. The interative control procedure is an embodiment of the first aspect of the present invention. In order to detect the differential rate Rd between the front wheels and the rear wheels, it is detected whether the vehicle speed v is greater than or equal to a predetermined value V1, whether the steering angle Ast is less than or equal to predetermined value Ast1, and whether the throttle opening Ath is less than or equal to a predetermined value Ath1. Such conditions prevail when carrying a light load running steady in a straight line. When the above conditions are detected, the restriction of differential action is released. Accodringly, the differential rate Rd can be detected since the difference between the behavior of the vehicle when the prevailing restriction of differential action and when operating free of differential action is extremely small, and since a very small differential rate due to the difference in effective radius of the tires can be easily and accurately detected.

Furthermore, in the control procedure, when the differential rate Rd is detected to be smaller than a predetermined value Rd1, the differential rate Rd is not detected again before the vehicle is stopped. When this occurs, frequent detections of the differential rate Rd (which requires frequent release of restriction of differential action), is discontinued, so that original control of the restriction of differential action in accordance with the running conditions can be fully performed. On the contrary, so long as the differential rate Rd is detected to be greater than or equal to a predetermined value, the differential rate Rd is detected every time the detecting conditions are established. In this case, if the differential rate is detected to be smaller than a predetermined value N consecutive times, restriction of differential action is permitted again. This is because the detection of the differential rate may have been imprecise, and original restriction of differential action should be performed repeatedly.

Until the detecting conditions are established for the first time after restart, the result of the detection of the previous time is stored and used as current value. Accordingly, when the result of the previous time is smaller than the predetermined value, the original restriction of differential action is performed under the conditions of the restriction of differential action corresponding to the various running conditions until the detecting conditions are again established. When the previous results are greater than or equal to the predetermined value, the restriction of differential action is prohibited until the detecting conditions are again established.

The flow chart shown in FIG. 4 will hereunder be described in detail. In Step 201, whether or not a flag F is set is detected. The flag F is adapted to indicate whether or not the differential rate Rd has been detected since the last time the vehicle was brought to a stop. When F is equal to 1, it is indicated that the detection has been performed. When F is not equal to 1, it is indicated that the detection has not been performed since the last stop. When F is equal to 1, the routine proceeds to Step 209, and, when F is not equal to 1, the routine proceeds to Step 202.

In Step 202, whether or not vehicle speed v is greater than or equal to a predetermined value V1, i.e., whether $v \geq V1$ is detected. When $v \geq V1$, the routine proceeds to Step 203. When $v < V1$, the routine proceeds to Step 208. In Step 208, whether or not the differential rate Rd is less than or equal to a predetermined value Rd1, i.e., whether $Rd \leq Rd1$ is detected. In this case, i.e., when the answer to Step 202 is "no", the differential rate Rd is the value of the previous detecting time, which has been stored.

In Step 203, whether or not steering angle Ast is less than or equal to the predetermined value Ast1, i.e., whether $Ast \leq Ast1$ is detected. When $Ast \leq Ast1$, the routine proceeds to Step 204. When $Ast > Ast1$, the routine proceeds to Step 208 such that a new value for Rd is not calculated.

In Step 204, whether or not throttle opening Ath is less than or equal to the predetermined throttle opening Ath1, i.e., whether $Ath \leq Ath1$, is detected. When $Ath \leq Ath1$, the routine proceeds to Step 205, when $Ath > Ath1$, the routine proceeds to Step 208 such that a new value for Rd is not calculated.

When the routine proceeds to Step 205, the current detecting conditions are established, i.e., the vehicle running conditions are determined to be stable, and the flag F is set at 1. In Step 206, the torque transmitting capacity Tc of the restriction of the differential control clutch unit 70 is set at 0, and the center differential gear unit 30 is made free i.e., the center differential is unrestricted. In Step 207, the rotary numbers of the left and right front wheels and the left and right rear wheels are detected, whereby the mean rotary speed of the front wheels nF and the mean rotary speed of the rear wheels nR are calculated, and the differential rate Rd is calculated in accordance with the following equation.

$$Rd = |1 - (nF / nR)| \qquad (1)$$

In Step 208, whether or not the differential rate Rd is smaller than the predetermined value Rd1 is detected. When $Rd < Rd1$, the original control of the restriction of differential action is performed thereafter. When $Rd \geq Rd1$, the routine proceeds to Step 210, where the restriction of differential action is prohibited regardless of the running conditions thenceforth. In Step 211, a counter C is set at a predetermined value N (N=3 for example).

In Step 209, whether or not the differential rate Rd, detected the previous time is smaller than the predetermined value Rd1 is detected. When $Rd < Rd1$, the process goes out of this routine and the original control of the restriction of differential action is performed. When $Rd \geq Rd1$, the routine proceeds to Step 212 in order to detect the differential rate Rd again. In Step 212, whether or not the vehicle speed $v \geq V1$ is detected. When $v \geq V1$, the routine proceeds to Step 213. When $v < V1$, the process goes out of this routine and prohibition of the restriction of differential action is continued. The value of the counter C is not changed. In Step 213, whether or not the steering angle $Ast \leq Ast1$ is detected. When $Ast \leq Ast1$, the routine proceeds to Step 214. When $Ast > Ast1$, the process goes out of this routine. In Step 214, whether or not the throttle opening $Ath \leq Ath1$ is detected. When $Ath \leq Ath1$, the routine proceeds to Step 215. When $Ath > Ath1$, the process goes out of this routine. In Step 215, the differential rate Rd is calculated according to equation (1) above. In Step 216, whether or not the differential rate $Rd < Rd1$ is detected. When $Rd < Rd1$, the routine proceeds to Step 217. When $Rd \geq Rd1$, the routine proceeds to Step 210. Namely, when $Rd \geq Rd1$, the routine goes through Steps 210 and 211, and the counter C is set at N again. In Step 217, the counter value C is reduced by 1. In Step 218, whether or not C is equal to 0 is determined. When C is not equal to 0, the process goes out of this routine and, when C is equal to 0, the routine proceeds to Step 219. In Step 219, because it has been determined N consecutive times that the differential rate Rd is smaller than the predetermined value Rd1, the restriction of differential action is permitted, whereby the original control of the restriction of differential action is performed.

The second embodiment of the present invention will hereunder be described in connection with in FIG. 5.

The above-described first embodiment is of the type wherein differential action of the center differential gear is constantly restricted (the four wheel drive system according to the first aspect of the present invention). However, in a second embodiment in accordance with the present invention, such an arrangement is adopted using a four wheel drive system similar to that of the first embodiment, wherein the center differential gear is held free during the normal time, and the differential action is suitably restricted in accordance with the running conditions of the vehicle, for example, during slippage of the front or rear wheels or when accelerating from a stop.

Figure 5:
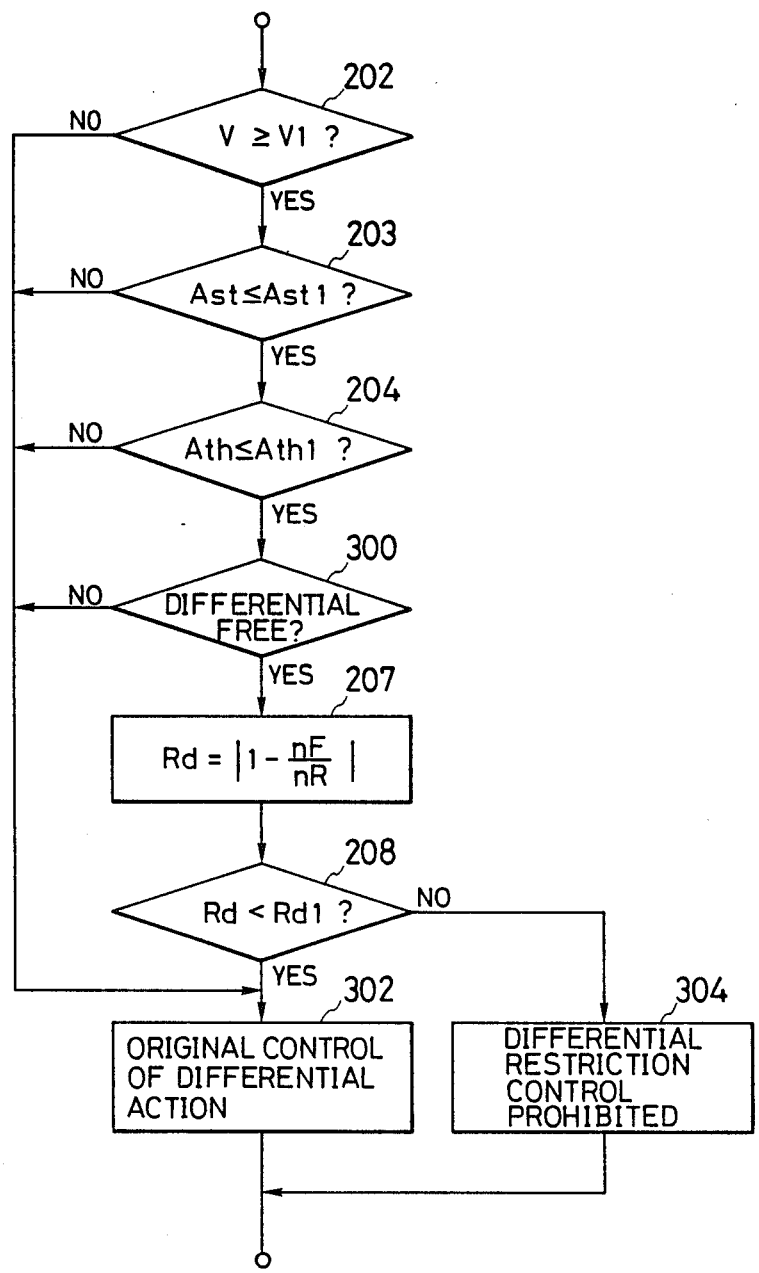
FIG. 5 is a flow chart showing another control procedure.

FIG. 5 shows an example of the control procedure adopted in the above-described second embodiment of the four wheel drive system. In FIG. 5, Steps of the control procedure similar to those shown in FIG. 4 are designated by like reference numerals. As is apparent from FIG. 5, similarly to the preceding embodiment, in Steps 202-204, whether or not the running conditions are stable is detected, and thereafter, in Step 300, whether or not the differential action of the center differential gear 30 is currently free or not is detected. When the running conditions are stable and the differential action is free, the routine proceeds to Step 207, where the differential rate Rd is calculated. In Step 208, whether or not the differential rate Rd thus calculated is smaller than the predetermined value Rd1 is detected. When $Rd < Rd1$, the routine proceeds to Step 302, where the original control of differential action is performed. When $Rd \geq Rd1$, the routine proceeds to Step 304 and the restriction of differential action is prohibited thenceforth.

In the four wheel drive system wherein the center differential gear is made free during normal operation as described above, because the original restriction of differential action can be performed without hindrance, the differential rate Rd can be calculated whenever the conditions necessary for calculating the differential rate Rd are established, whereby the differential rate Rd can be assigned an updated value.

What is claimed is:

1. A four wheel drive system for a vehicle, wherein differential action between front wheels and rear wheels is restricted during at least a portion of the running time of said vehicle, and restriction or paid differential action can be released or a degree of said restriction can be changed as necessary, comprising:
   means for detecting whether or not running conditions of said vehicle are stable, which requires at least said running conditions being stable when a vehicle speed is greater than or equal to a predetermined value, and an engine load is less than or equal to a predetermined value;
   means for temporarily releasing said restriction of differential action when said running conditions of said vehicle are detected as being stable;
   means for detecting a differential rate between said front wheels and rear wheels upon release of said restriction of differential action; and
   means for prohibiting said restriction of differential action when said differential rate is detected to be greater than or equal to a predetermined value.

2. The system as set forth in claim 1, wherein said means for detecting whether or not running conditions of said vehicle are stable comprises:
   means for detecting a vehicle speed;
   means for detecting a steering angle;
   means for detecting an engine load;
   and said means for detecting whether running conditions of said vehicle are stable detects whether or not said stable conditions are established based on whether said vehicle speed is greater than or equal to a predetermined value, said steering angle is less than or equal to a predetermined value, and said engine load is less than or equal to a predetermined value.

3. The system as set forth in claim 1, further comprising means for detecting when the vehicle is stopped, wherein, after said differential rate is detected to be smaller than a predetermined value, said release of said restriction of differential action for detecting said differential rate is stopped until the vehicle comes to a standstill.

4. The system as set forth in claim 1, further comprising means for detecting when the vehicle is stopped, wherein, after said differential rate is detected to be greater than or equal to a predetermined value, said differential rate is detected when the running conditions of the vehicle are stable, until the vehicle comes to a standstill.

5. The system as set forth in claim 4, further comprising means for iteratively detecting whether said differential rate is smaller than a predetermined value, and means for counting a number of consecutive times that said iterative means indicates that said differential rate is smaller than said predetermined value, wherein, when said number of consecutive times equals a predetermined value, said prohibition of said restriction of differential action is released.

6. A four wheel drive system for a vehicle, wherein differential action between front wheels and rear wheels is permitted during normal operation, and said differential action therebetween is restricted as necessary, comprising:
   means for detecting whether or not running conditions of said vehicle are stable said running conditions being stable when vehicle speed is greater than or equal to a predetermined value, and an engine load is less than or equal to a predetermined value;
   means for detecting whether or not said differential action is restricted;
   means for detecting a differential rate between said front wheels and rear wheels when it is detected that said running conditions of said vehicle are stable and said differential action is not restricted; and
   means for prohibiting said restriction of differential action when said differential rate is greater than or equal to a predetermined value.

7. The system as set forth in claim 6, wherein said means for detecting whether or not running conditions of said vehicle are stable comprises:
   means for detecting a vehicle speed;
   means for detecting a steering angle; and
   means for detecting an engine load;
   and said means for detecting whether running conditions of said vehicle are stable detects whether or not said stable conditions are established based on whether said vehicle speed is greater than or equal to a predetermined value, said steering angle is less than or equal to a predetermined value, and said engine load is less than or equal to a predetermined value.

* * * * *

UNITED STATES PATENT AND TRADEMARK OFFICE
CERTIFICATE OF CORRECTION

PATENT NO. : 4,867,262
DATED : September 19, 1989
INVENTOR(S) : Mitsuru TAKADA et al.

It is certified that error appears in the above-identified patent and that said Letters Patent is hereby corrected as shown below:

Claim 1, line 4, change "or paid" to --of said--;

line 8, delete "which requires at";

line 9, delete "least".

Signed and Sealed this

Twenty-first Day of August, 1990

Attest:

HARRY F. MANBECK, JR.

*Attesting Officer*      *Commissioner of Patents and Trademarks*